US011118079B2

(12) United States Patent
Turkki et al.

(10) Patent No.: US 11,118,079 B2
(45) Date of Patent: Sep. 14, 2021

(54) WATER-BASED BARRIER COATINGS

(71) Applicant: KEMIRA OYJ, Helsinki (FI)

(72) Inventors: Tarja Turkki, Helsinki (FI); Sai Li, Espoo (FI); Jonni Ahlgren, Espoo (FI)

(73) Assignee: KEMIRA OYJ, Helsinki (FI)

(*) Notice: Subject to any disclaimer, the term of this patent is extended or adjusted under 35 U.S.C. 154(b) by 234 days.

(21) Appl. No.: 16/066,779

(22) PCT Filed: Dec. 28, 2016

(86) PCT No.: PCT/FI2016/050928
§ 371 (c)(1),
(2) Date: Jun. 28, 2018

(87) PCT Pub. No.: WO2017/115009
PCT Pub. Date: Jul. 6, 2017

(65) Prior Publication Data
US 2018/0355204 A1    Dec. 13, 2018

(30) Foreign Application Priority Data

Dec. 31, 2015  (FI) ...................................... 20156036

(51) Int. Cl.
| | | |
|---|---|---|
| C09D 125/14 | (2006.01) | |
| C09D 133/10 | (2006.01) | |
| D21H 19/56 | (2006.01) | |
| D21H 19/40 | (2006.01) | |
| D21H 19/54 | (2006.01) | |
| D21H 19/50 | (2006.01) | |
| B65D 65/42 | (2006.01) | |
| C08L 29/04 | (2006.01) | |
| C09D 133/06 | (2006.01) | |
| C09D 129/04 | (2006.01) | |
| C08F 212/08 | (2006.01) | |
| C08F 261/04 | (2006.01) | |
| C08F 251/00 | (2006.01) | |
| C09D 151/02 | (2006.01) | |
| C08F 220/18 | (2006.01) | |
| C08K 3/34 | (2006.01) | |
| C08K 5/053 | (2006.01) | |
| C08L 3/02 | (2006.01) | |
| C08L 89/00 | (2006.01) | |
| C08L 93/04 | (2006.01) | |

(52) U.S. Cl.
CPC ........... *C09D 125/14* (2013.01); *B65D 65/42* (2013.01); *C08F 212/08* (2013.01); *C08F 251/00* (2013.01); *C08F 261/04* (2013.01); *C08L 29/04* (2013.01); *C09D 129/04* (2013.01); *C09D 133/06* (2013.01); *C09D 133/10* (2013.01); *C09D 151/02* (2013.01); *D21H 19/40* (2013.01); *D21H 19/50* (2013.01); *D21H 19/54* (2013.01); *D21H 19/56* (2013.01); *C08F 220/18* (2013.01); *C08F 2800/20* (2013.01); *C08K 3/34* (2013.01); *C08K 5/053* (2013.01); *C08L 3/02* (2013.01); *C08L 89/005* (2013.01); *C08L 93/04* (2013.01)

(58) Field of Classification Search
CPC ......... C08L 29/00; C09D 5/00; C09D 125/14; C09D 133/10; C08J 5/18; C09K 3/14; D21H 19/56; D21H 19/54; D21H 19/50; D21H 19/40; C08F 2800/20; B65D 65/42
See application file for complete search history.

(56) References Cited

U.S. PATENT DOCUMENTS

| | | |
|---|---|---|
| 4,350,788 A | 9/1982 | Shimokawa et al. |
| 6,605,663 B1 | 8/2003 | Weitzel |
| 2010/0069597 A1 | 3/2010 | Venkatesh et al. |
| 2012/0135652 A1 | 5/2012 | Dandenault et al. |

FOREIGN PATENT DOCUMENTS

| | | | | |
|---|---|---|---|---|
| CN | 101338058 A | | 1/2009 | |
| CN | 101636419 A | | 1/2010 | |
| CN | 102639635 A | | 8/2012 | |
| CN | 103265655 | * | 8/2013 | ............ C08F 226/02 |
| CN | 103265655 A | | 8/2013 | |
| CN | 103757980 A | | 4/2014 | |
| GB | 2084588 A | | 4/1982 | |
| JP | 2002-105383 A | | 4/2002 | |
| JP | 2008-248399 A | | 10/2008 | |
| JP | 2012528900 A | | 11/2012 | |

(Continued)

OTHER PUBLICATIONS

Office Action (Notification of the First Office Action) dated Jan. 2, 2020, by the Chinese Patent Office in corresponding Chinese Patent Application No. 201680080633.5, and an English Translation of the Office Action. (19 pages).

Office Action (Notice of Grounds for Rejection) dated Feb. 10, 2020, by the Korean Patent Office in corresponding Korean Patent Application No. 10-2018-7022172, and an English Translation of the Office Action. (17 pages).

"Methods in Carbohydrate Chemistry"; vol. IV, Academic Press New York and Frankfurt, 1964, p. 127. (10 pages).

(Continued)

*Primary Examiner* — Robert D Harlan
(74) *Attorney, Agent, or Firm* — Buchanan Ingersoll & Rooney PC

(57) ABSTRACT

A water-based barrier coating composition suitable for use as a barrier coating is disclosed which includes an aqueous polymer composition obtainable by free radical (co)polymerizing an ethylenically unsaturated monomer blend having an optionally substituted styrene, at least one C1-C4-alkyl (meth)acrylate, other ethylenically unsaturated copolymerizable monomers, degraded starch polyvinyl alcohol (PVA), a plasticizer; a composition having C16-C18 alkenyl ketene dimer, optionally as a mixture with rosin, of a gelling agent; and optionally a filler.

26 Claims, 3 Drawing Sheets

(56) References Cited

FOREIGN PATENT DOCUMENTS

| JP | 2015-151647 A | 8/2015 | |
|---|---|---|---|
| WO | 2006007239 A2 | 1/2006 | |
| WO | WO 2010/139070 A1 | 12/2010 | |
| WO | WO-2010139070 A1 * | 12/2010 | ........... C09D 125/14 |

OTHER PUBLICATIONS

Finnish Search Report dated Jun. 27, 2016, by the Finnish Patent Office in corresponding Finnish Application No. 20156036. (2 pages).
The extended European Search Report dated Jan. 8, 2019, by the European Patent Office in corresponding European Application No. 16881325.1. (10 pages).
International Search Report (PCT/ISA/210) dated Mar. 3, 2017, by the Finnish Patent Office as the International Searching Authority for International Application No. PCT/FI2016/050928.
Written Opinion (PCT/ISA/237) dated Mar. 3, 2017, by the Finnish Patent Office as the International Searching Authority for International Application No. PCT/FI2016/050928.

* cited by examiner

Ref

1

2

3

4

5

6

P1+T1

P1+T2

P1+T3

E1+G2+G10

E2+G2+G10

WATER-BASED BARRIER COATINGS

FIELD OF THE INVENTION

The present invention relates to barrier coating of paper and paperboard, in particular to water-based barrier coating compositions for forming a barrier coating and a method of barrier coating paper and paperboard.

BACKGROUND OF THE INVENTION

The primary ingredient in a water-based barrier coating is a polymer. The factors affecting the barrier properties of polymers in general are crystallinity, orientation, molecular structure and polarity, and the atmospheric conditions. In addition, the ability to form a pinhole-free film on the substrate is crucial.

Film formation of dispersions refers to a coalescence of polymer particles upon drying. Film formation proceeds from water evaporation and packing of polymer particles to deformation of these particles due to capillary forces, and finally to interdiffusion of polymer molecules across the particle boundaries. Good and uniform film is crucial when aiming for a pinhole free barrier layer.

Cracking on fold has been the biggest problem in the state of the art barrier coating application leading to loss of barrier properties.

BRIEF DESCRIPTION OF THE INVENTION

An object of the present invention is thus to provide a water-based barrier coating composition and a method for barrier coating paper and paperboard, a subject coated with one or more layers of present water-based coating composition and use of present water-based barrier coating composition for forming a grease barrier on paper or paperboard. so as to overcome the above problems. The objects of the invention are achieved by a composition and a method, which are characterized by what is stated in the independent claims. The preferred embodiments of the invention are disclosed in the dependent claims.

The invention is based on the idea of providing a water-based barrier coating composition comprising 2 to 55% by weight of the total weight of (A) of polyvinyl alcohol (PVA); (iii) 0 to 30% by weight of the total weight of (A) of a plasticizer; (iv) 0 to 30% by weight of the total weight of (A) of a composition comprising C16-C18 alkenyl ketene dimer, optionally as a mixture with rosin; (v) 0 to 20% by weight of the total weight of (A) of a gelling agent; in addition to an aqueous polymer composition (i) obtainable from an ethylenically unsaturated monomer blend. An advantage of the present composition is that provides a barrier coating, in particular a grease barrier coating, resistant to cracking on fold.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
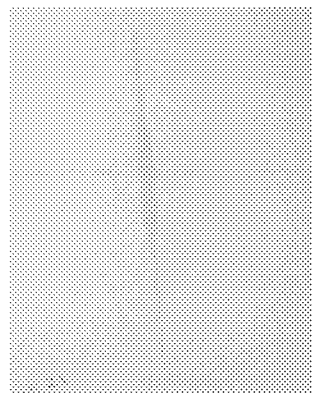
FIG. 1 shows a first set of creasing test images.
Figure 1:
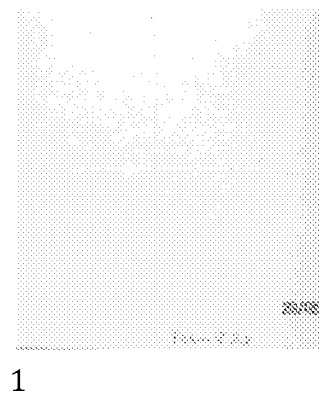
Figure 1:
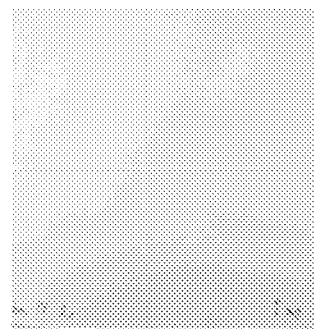
Figure 1:
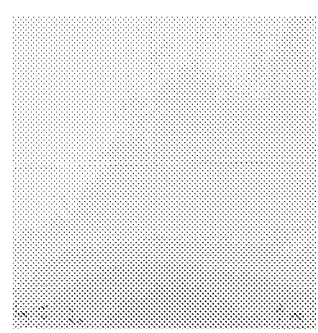
Figure 1:
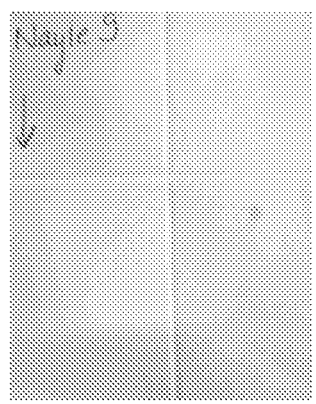
Figure 1:
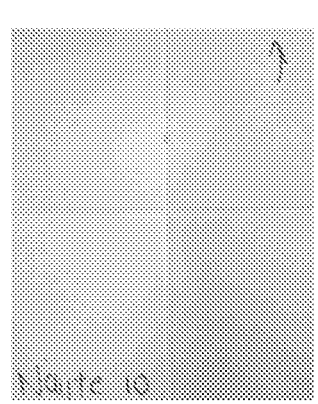
Figure 1:
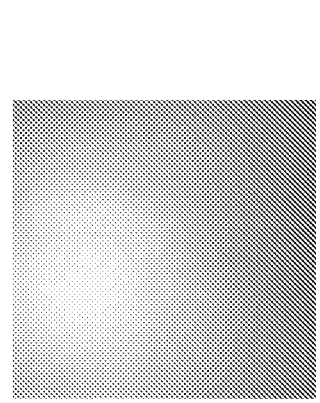

Provided herein is water-based barrier coating composition comprising (A):
(i) 40 to 95% by weight of the total weight of (A) an aqueous polymer composition obtainable by free radical emulsion (co)polymerizing a first ethylenically unsaturated monomer blend comprising
(a) 0 to 70% by weight of at least one optionally substituted styrene,
(b) up to 100% by weight of at least one C1-C4-alkyl (meth)acrylate,
(c) 0 to 10% by weight of other ethylenically unsaturated copolymerizable monomers,
in the presence of
(d) 0 to 40% % by weight of degraded starch having a molecular weight Mn of 500 to 10,000,
wherein the sum (a)+(b)+(c)+(d) is 100%;
(ii) 2 to 55% by weight of the total weight of (A) of polyvinyl alcohol (PVA), optionally polymerized together with the components of (i);
(iii) 0 to 30% by weight of the total weight of (A) of a plasticizer;
(iv) 0 to 30% by weight of the total weight of (A) of a composition comprising C16-C18 alkenyl ketene dimer, optionally as a mixture with rosin, whereby in the ratio of the C16-C18 alkenyl ketene dimer:rosin is from 100:0 to 25:75;
(v) 0 to 20% by weight of the total weight of (A) of a gelling agent;
and
optionally (B): a filler.

The aqueous polymer composition (A) does not need to comprise styrene. However, the amount of monomer(s) of group (a) is preferably 20 to 60%, more preferably 30 to 60%, by weight. Examples of suitable monomers of group (a) include styrene and substituted styrenes, such as α-methylstyrene, vinyltoluene, ethylvinyltoluene, chloromethylstyrene, and mixtures thereof.

The amount of monomer(s) of group (b) may be up to 100% by weight when the aqueous polymer composition is polymerized in the absence of starch (d) and styrene (a). However, the amount of monomer(s) of group (b) is preferably 80 to 30%, more preferably 60 to 30% by weight. Examples of suitable monomers of group (b) include C1-C4-alkyl acrylates, C1-C4-alkyl methacrylates or mixtures thereof, such as n-butyl acrylate, iso-butyl acrylate, tert-butyl acrylate, and 2-butyl acrylate and the corresponding butyl methacrylates n-butyl methacrylate, iso-butyl methacrylate, tert-butyl methacrylate, and 2-butyl methacrylate, and furthermore methyl acrylate, methyl methacrylate, ethyl acrylate, ethyl methacrylate, propyl acrylate or propyl methacrylate. A mixture of at least two isomeric butyl acrylates is possible, it being possible for the mixing ratio to be 10:90 to 90:10. Preferred monomer of group (b) is n-butyl acrylate.

Suitable monomers of the group (c) are further ethylenically unsaturated monomers, such as ethylhexyl acrylate, stearyl acrylate, stearyl methacrylate and further esters of acrylic and methacrylic acid with alcohols which have more than four C atoms, and furthermore acrylonitrile, methacrylonitrile, acrylamide, vinyl acetate or anionic co-monomers, such as acrylic acid, methacrylic acid, styrenesulphonic acid. Particularly preferred monomers of group (c) are acrylic acid and styrenesulphonic acid. However, preferably the amount of monomers of group (c) is 0% by weight.

Starch (d) may be present in polymerization stage if appropriate. Natural starches, such as potato, wheat, maize, rice or tapioca starch, are suitable as starch, potato starch being preferred. Starch types having a high amylopectin content of 80% or higher are preferably used. Potato starch having an amylopectin content >95% is particularly preferred. It is also possible to use chemically modified starches, such as hydroxyethyl- or hydroxypropyl-starches, or starches which contain anionic groups, such as, for example, phosphate starch, or cationic starches which contain quaternized ammonium groups, a degree of substitution DS=0.01-0.2 being preferred. The degree of substitution DS indicates the number of cationic groups which are contained in the starch on average per glucose unit. Amphoteric starches which contain both quaternary ammonium groups and anionic groups, such as carboxylate and/or phosphate groups, and which optionally can also be chemically modified, for example hydroxyalkylated or alkyl-esterified, are particularly preferred. The starch (d) to be used according to the invention may be obtained by subjecting said starch types to oxidative, thermal, acidic or enzymatic degradation. Oxidative degradation of the starch is preferred. Oxidizing agents, such as hypochlorite, peroxodisulphate or hydrogen peroxide, or combinations thereof, which are preferably used in succession to establish the desired molecular weight of the starch, are suitable for the degradation. Starch degradation with hypochlorite, as usually carried out for improving the dissolution properties of the starch, and a further degradation, for example with hydrogen peroxide, which can be carried out, for example, shortly before the subsequent graft copolymerization, is particularly preferred. In this case, hydrogen peroxide (calculated as 100%) is used in concentrations of 0.3 to 5.0% by weight, based on starch employed. The amount of hydrogen peroxide depends on the molecular weight to which the starch is to be degraded.

The starches (d) degraded in this manner preferably have an average molecular weight $M_n$ of 500 to 10,000, with the result that, on the one hand, good dispersing of the emulsion polymers is ensured and, on the other hand, premature crosslinking and precipitation of the polymerization batch is avoided. The average molecular weight of the degraded starch can readily be determined by gel chromatographic analysis processes after calibration, for example with dextran standards, by known methods. Viscosimetric methods, as described, for example, in "Methods in Carbohydrate Chemistry"; Volume IV, Academic Press New York and Frankfurt, 1964, page 127", are also suitable for the characterization. The intrinsic viscosity thus determined is preferably 0.05 to 0.12 dl/g.

The monomers of the polymer composition are chosen so that the glass transition temperature of the obtained (co) polymer is preferably from −40° C. to 50° C., preferably from −10° C. to 30° C.

Polymerization with a redox system comprising hydrogen peroxide and metal ions is particularly preferred. The polymerization may be continued by addition of an oil-soluble, sparingly water-soluble free radical initiator. The oil-soluble, sparingly water-soluble free radical initiators is preferably added continuously during the addition of a second monomer batch for subsequent activation after the polymerization with the water-soluble redox system, and the polymerization is completed therewith.

The total concentration of the composition (A) is typically between 10 and 50% by weight, preferably between 20 and 45% by weight. The amount of the aqueous polymer composition (i) in (A) is preferably 40 to 95% by weight of the total weight of (A).

Mixture of (i) and (ii) may be obtained by polymerizing said components together i.e. by polymerizing the components of (i) in the presence of polyvinyl alcohol (PVA) (ii). When mixture of (i) and (ii) is obtained by polymerizing PVA (ii) together with the components of (i) the ratio of (i):(ii) is preferably from 45:55 to 60:40, more preferably 1:1. Further when mixture of (i) and (ii) is obtained by polymerizing PVA (ii) together with the components of (i) the amount of (i) in (A) is preferably 45 to 60% by weight of the total weight of (A).

In an example a mixture of (i) and (ii) is obtained by free radical copolymerization of ethylenically unsaturated monomers comprising (a) 0 to 60% by weight of at least one optionally substituted styrene, (b) up to 100% by weight of at least one C1-C4-alkyl (meth)acrylate, and (c) 0 to 10% by weight of other ethylenically unsaturated copolymerizable monomers and (ii), in the presence of (d) 0 to 40% by weight of degraded starch having a molecular weight $M_n$ of 500 to 10,000, and (e) a graft-linking, water-soluble redox system as free radical initiator for the free radical emulsion copolymerization, wherein the sum (a)+(b)+(c)+(d)+(ii) is 100%.

When mixture of components (i) and (ii) is obtained by polymerizing said components together it is not necessary to include starch in the composition. Thus in a particular example the amount of (d) is 0% by weight.

Alternatively PVA (ii) may be added to aqueous polymer composition (i) by blending. Other additives can also be added to the formulation by blending. When (ii) is added by blending the amount of starch (d) is preferably 20 to 40% by weight. When PVA (ii) is added to (i) by blending the amount of (i) in (A) is preferably from 50 to 95% by weight of the total weight of (A), more preferably the amount of (i) in (A) is 50 to 95% by weight of the total weight of (A), even more preferably the amount of (i) 75 to 85% by total weight of (A).

The choice of PVA grade affects barrier properties. Less hydrolyzed grade gives better oxygen barrier properties while more hydrolyzed grade improves water vapor and oil barrier properties. Preferably PVA is selected from a group consisting of fully or partially hydrolyzed grades having molecular weight of 50000 or less.

When mixture of (i) and (ii) is obtained by polymerizing PVA (ii) together with the components of (i) the amount of PVA (ii) in (A) is preferably 40 to 55% by weight of the total weight of (A). When mixture of (i) and (ii) is obtained by polymerizing PVA (ii) together with the components of (i) most preferably the amount of (i) is 45 to 60% by weight of the total weight of (A) and the amount of (ii) is 40 to 55% by weight of the total weight of (A).

When PVA (ii) is added to (i) by blending the amount of the amount of PVA (ii) in (A) is preferably 2 to 20, more preferably 5 to 15% by weight of the total weight of (A). When PVA (ii) is added to (i) by blending most preferably the amount of (i) 75 to 85% by total weight of (A) and the amount of the amount of PVA (ii) in (A) is 2 to 20.

The presence of component (iii) is not required for obtaining acceptable properties, in particular in cases where components (i) and (ii) are polymerized together. Thus in an aspect of the invention the amount of component (ii) is 0%. When components (i) and (ii) are not polymerized together and/or starch (d) is present in the polymer the amount of component (iii) is preferably 2 to 30%, more preferably 3 to 10%, by weight of the total weight of (A).

Suitable examples of plasticizer of group (iii) are those selected from a group consisting of glycerol, polyethylene glycol (PEG), sorbitol, and mixtures thereof. Use of a plasticizer is preferred as their presence increase the deformability of starch.

Presence of a composition comprising C16-C18 alkenyl ketene dimer, optionally as a mixture with rosin, (iv) is also preferred in the water-based coating composition as it increases the hydrophobicity of the coating layer and decreases the interaction with water. These surface sizes are stable enough to be used in this kind of formulations. The composition typically consists of C16-C18 alkenyl ketene dimer, optionally as a mixture with rosin, and starch. The amount of C16-C18 alkenyl ketene dimer in the composition (iv) is typically 6 to 20%, preferably 12 to 18%, by weight of the total weight of the composition (iv). The amount of rosin in the composition (iv) is typically 15 to 30% by weight of the total weight of the composition (iv). When C16-C18 alkenyl ketene dimer is provided as a mixture with rosin the ratio of the C16-C18 alkenyl ketene dimer:rosin is preferably from 8:2 to 2:8, more preferably 1:1. The amount of composition (iv) is preferably from 0 to 15% by weight, more preferably from 5 to 12% by weight, of the total weight of (A).

A gelling agent (v) may also be included in the water-based coating composition to adjust the rheological properties, improve film formation as water soluble compounds and/or bridge to starch molecules and decrease the brittleness. The gelling agent is typically either a protein or an alginate. Suitable examples of gelling agents of group (v) are those selected from a group consisting of corn, zein, whey, casein soy protein, carboxy methyl cellulose, and gluten. Preferably the gelling agent (iv) is gluten. Preferably the amount of (v) is 5 to 20% by weight, more preferably 10 to 18% by weight, of the total weight of (A).

The water-based barrier coating composition may optionally comprise a filler (B). Filler is typically present when the water-based barrier coating composition is used as a precoat on a subject. When the water-based barrier coating composition is used as a topcoat, (B) is typically not present. The filler (B) is preferably talc or kaolin, or a mixture thereof, as they as highly platy pigments create a tortuous path for moisture, oil, grease and oxygen transmission. The ratio of (A):(B), when (B) is present, is preferably from 2:5 to 1:1.

Provided herein is also a method for barrier coating a subject, preferably paper or paperboard, comprising applying a water-based coating composition as defined herein to at least part of a surface of said subject. If desired the surface to be coated may be pre-coated with a conventional coating composition prior to applying the present water based coating composition to the surface.

In one example the said method comprises applying a first water-based coating composition, wherein said first water based coating composition comprises (B), to at least part of the surface of the subject to obtain a precoated subject, and then applying a second water-based composition as claimed in any one of claims 1 to 15, wherein said second water based coating composition does not comprise (B), to at least precoated surface of the precoated subject to obtain a top coated subject. The first water-based coating composition preferably comprises 0% by weight of (iv) and the second water-based coating composition preferably comprises more than 0% by weight of (iv).

In another example the said method comprises applying a first water-based pre coating composition, wherein said first water based pre coating composition comprising an aqueous polymer composition obtainable by free radical (co)polymerizing an ethylenically unsaturated monomer blend comprising
(a) 0 to 70% by weight of at least one optionally substituted styrene,
(b) up to 100% by weight of at least one C1-C4-alkyl (meth)acrylate,
(c) 0 to 10% by weight of other ethylenically unsaturated copolymerizable monomers,
in the presence of
(d) 0 to 40% % by weight of degraded starch having a molecular weight $M_n$ of 500 to 10,000,
wherein the sum (a)+(b)+(c)+(d) is 100%;
and (B),
to at least part of the surface of the subject to obtain a precoated subject, and then applying a water-based composition as defined herein, wherein said water based coating composition does not comprise (B), to at least precoated surface of the precoated subject to obtain a top coated subject.

In this example the method may further comprise applying a second water based pre coating composition comprising an aqueous polymer composition obtainable by free radical (co)polymerizing an ethylenically unsaturated monomer blend comprising
(a) 0 to 70% by weight of at least one optionally substituted styrene,
(b) up to 100% by weight of at least one C1-C4-alkyl (meth)acrylate,
(c) 0 to 10% by weight of other ethylenically unsaturated copolymerizable monomers,
in the presence of
(d) 0 to 40% % by weight of degraded starch having a molecular weight $M_n$ of 500 to 10,000,
wherein the sum (a)+(b)+(c)+(d) is 100%;
0 to 30% by weight of the total weight of (A) of a plasticizer;
0 to 20% by weight of the total weight of (A) of a gelling agent;
to at least part of the surface of the subject to obtain a further precoated subject, before applying the water-based composition as defined herein to the further precoated surface of the subject.

Provided herein is also a subject coated with one or more layers of a water-based coating composition as defined herein.

The subject discussed herein in is preferably paper or paperboard, in particular a food packaging.

In particular provided herein is use of a water-based barrier coating composition as defined herein for forming a grease barrier on paper or paperboard.

EXAMPLES

Preparation Examples

Preparation of polymer bases e.g. component (i) or mixture of components (i)+(ii) are explained in below examples. The remaining components shown in Table 1 were then blended with these polymer bases in amounts indicated.

Polymer Base Example 1

80.17 g of an oxidatively degraded potato starch (Perfectamyl A 4692) was dispersed with stirring in 232.12 g of demineralizer water in a 1 L glass reactor with a cooling/heating jacket under a nitrogen atmosphere. The starch was dissolved by heating the mixture to 95° C. and cooking at 95° C. for 60 minutes. After starch dissolution was complete, 0.02 g of aqueous solution of ferrous (II) sulfate heptahydrate dissolved in small amount of water was added in to the reactor. After 15 minutes 3.83 g of 30% strength hydrogen peroxide was added. After 120 minutes, the starch degradation was complete. Then the chemical feeds were started. 151.45 g of n-butyl acrylate and 81.55 g of styrene were fed during 250 minutes. 40.75 g of 8% solution of hydrogen peroxide was fed simultaneously with the monomer feed during 255 min. The reactor temperature was kept at 95° C. during the feeds and 15 minutes after for postpolymerization. Then the mixture was cooled to 60° C. and 0.63 g of 70% strength tert-butyl hydroperoxide solution was added dropwise into the reactor. The temperature was kept at 60° C. for further 60 min. Thereafter, cooling was effected to 40° C. and 0.5 g of ethylenediaminetetraacetic acid sodium salt (EDTA-Na) solution was added, followed by pH adjustment to 6 with 50% strength sodium hydroxide solution and cooling to room temperature. Filtration was performed using a 100 μm filter cloth. A finely divided dispersion with a solid content of 50% and Tg 0° C. is obtained.

Polymer Base Example 2

613.73 g of water and 108.31 g of polyvinyl alcohol were weighed in to a 1 L glass reactor with a cooling/heating jacket. The jacket was heated to 95° C. Nitrogen atmosphere was kept in the reactor and stirring was continued throughout the reaction. After the jacket had reached its goal temperature, chemical feeds into the reactor were started. 0.0084 g of iron sulfate was added. Monomer feed consisting of 54.2 g styrene and 54.2 g of n-butyl acrylate were fed together with 0.43 g hexadecenyl succinic anhydride and 18.94 g hydrogen peroxide of 8% strength in 250 minutes. Temperature in the reactor was kept at 95° C. during the feeds and for 15 minutes after the feeds ended. Then 42.4 g of 70% strength tert-butyl hydroperoxide solution was added into the reactor during 15 minutes. The temperature was kept at 95° C. for further 60 minutes. Thereafter, cooling was effected to room temperature and pH was adjusted to 6.2 with 50% strength sodium hydroxide solution. Filtration was performed using a 100 μm filter cloth. A finely divided dispersion with a solids content of 24.5% and Tg 23° C. was obtained.

Example 1

Table 1 shows a set of barrier coating formulations tested for cracking on crease and fold. The amounts of components are given in % by weight of the total weight of the composition.

TABLE 1

Tested barrier coating formulations

|  | Ref | 1 | 2 | 3 | 4 | 5 | 6 |
|---|---|---|---|---|---|---|---|
| Polymer base 1 (starch) Tg 23° C. | 98 | 80.6 | 80.6 | 80.6 | 80.6 | 80.6 |  |
| Polymer base 2 (PVA) Tg 23° C. |  |  |  |  |  |  | 100 |
| AKD/rosin 50:50 composition |  | 8.1 | 8.1 | 8.1 |  |  |  |
| AKD/rosin 25:75 composition |  |  |  |  | 8.1 |  |  |
| AKD/rosin 75:25 composition |  |  |  |  |  | 8.1 |  |
| Glycerol | 2 | 3.2 |  |  | 3.2 | 3.2 |  |
| Pelyethylene glycol 300 |  |  | 3.2 |  |  |  |  |
| Pelyethylene glycol 4000 |  |  |  | 3.2 |  |  |  |
| PVA Mw 47000 |  | 8.1 | 8.1 | 8.1 | 8.1 | 8.1 |  |

All coating tests were carried on a 130 g/m² liner board. Samples were draw down coated using smooth rod and dried using a IR dryer. Creasing tests were carried out using Cyklos GBM 450 creasing unit. Creasing test images for each of the compositions for Example 1 are shown in FIG. 1. Samples are normally photographed from the reverse side and any penetrated dye would be seen in crease lines.

For barrier tests used substrate was liner board with basis weight of 130 g/m². Coating was done on the smooth side of liner (2 coating weights) using Erichsen sheet coater and metering with grooved rods. Drying at 105° C. in a laboratory oven for adequate time. Water vapor and grease barrier properties of formulations 2, 3, and 4 as shown in Table 2.

Barrier properties:
    Oxygen (ASTM D3985; 23° C./50% r.h. & 80% r.h.)
    Water vapor (ASTM E-96, D3985 & F1927; 23° C./50% r.h.)
    Water (ISO 535, EN 20535 & TAPPI T 441; Cobb 300s)
    Grease and oil
        KIT test, 3 parallel
        Olive oil at 40° C. (ISO 16235-2 & TAPPI 507 cm-99)

TABLE 2

Water vapor and grease barrier properties of formulations 2, 3, and 4

|  | 2 | | 3 | | 4 | |
|---|---|---|---|---|---|---|
| Coat weight (g/m²) | 15 | 27 | 14 | 22 | 15 | 21 |
| WVTR (g/m²/day) | 61 | 39 | 70 | 44 | 77 | 60 |
| KIT | 12 | 12 | 12 | 12 | 12 | 12 |
| Grease barrier | ok | ok | ok | ok | ok | ok |

Example 2. Double Coated Samples with Different Pre and Top Coats

Tables 3 and 4 show a second set of tested coating formulations, double coating using separate pre and top coats tested for cracking on crease and fold. The amounts of components are given in % by weight of the total weight of the composition.

TABLE 3

Pre coat formulation

|  | P1 |
|---|---|
| Finntalc C15B slurry | 28.5 |
| Polymer base 1 (starch) Tg 10 | 66.7 |
| PVA Mw 47000 fully hydrolyzed | 4.8 |

TABLE 4

Top coat formulations

|  | T1 | T2 | T3 |
|---|---|---|---|
| Styrene acrylate (starch) Tg 23 |  | 76 | 54.5 |
| Styrene acrylate (starch) Tg 10 | 78.2 |  |  |

TABLE 4-continued

| Top coat formulations | | | |
|---|---|---|---|
| | T1 | T2 | T3 |
| PVA Mw 47000 fully hydrolyzed | 9.1 | 10 | |
| PEG 300 | 3.6 | 4 | |
| AKD composition, anionic | 9.1 | 10 | 9.1 |
| Glycerol | | | 22.7 |
| Gluten | | | 13.6 |

Figure 2:
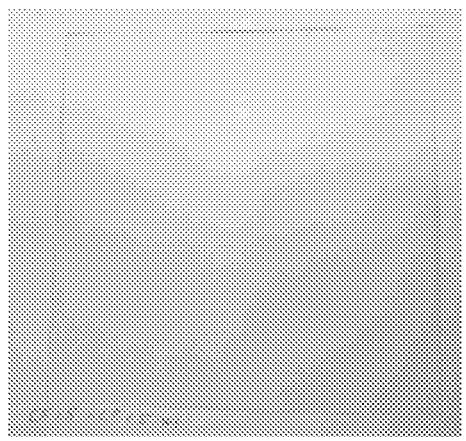
FIG. 2 shows a second set of creasing test images.
Figure 2:
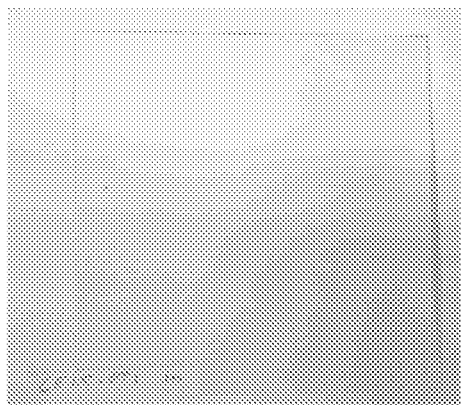
Figure 2:

All coating tests were carried on a 130 g/m² liner board. Samples were draw down coated using smooth rod and dried using a IR dryer. Creasing tests were carried out using Cyklos GBM 450 creasing unit. Creasing test images for double coated samples with indicated coating layers of Example 2 are shown in FIG. 2.

Example 3. Triple Coated Samples with Different Pre Coats

Tables 5 to 7 show a third set of tested coating formulations, triple coating using separate pre and top coats tested for cracking on crease and fold. The amounts of components are given in % by weight of the total weight of the composition.

TABLE 5

| Pre coat formulations | | |
|---|---|---|
| | E1 | E2 |
| Polymer base 1 (starch) Tg 23° C. | 30 | 50 |
| Talc | 70 | 50 |

TABLE 6

| Middle coat formulation | |
|---|---|
| | G2 |
| Polymer base 1 (starch) Tg 23° C. | 60 |
| Glycerol | 15 |
| Gluten | 25 |

TABLE 7

| Top coat formulation | |
|---|---|
| | G10 |
| Polymer base 1 (starch) Tg 23° C. | 50 |
| Glycerol | 30 |
| Gluten | 18 |
| PVA | 2 |
| AKD composition, anionic | 10 |

Figure 3:
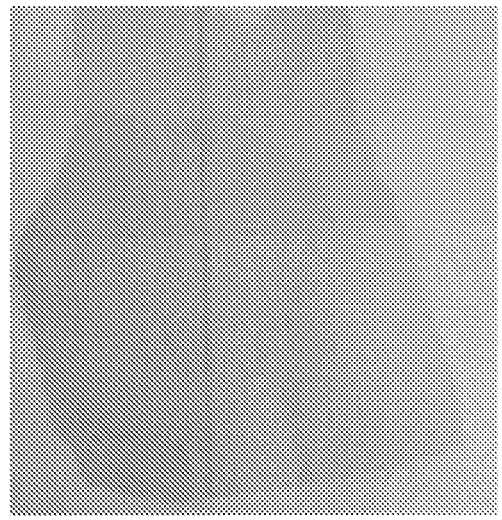
FIG. 3 shows a third set of creasing test images.
Figure 3:
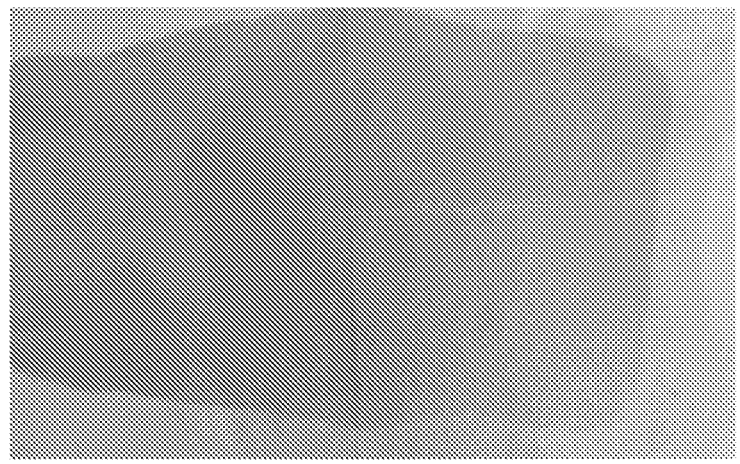

All coating tests were carried on a 130 g/m² liner board. Samples were draw down coated using smooth rod and dried using a IR dryer. Creasing tests were carried out using Cyklos GBM 450 creasing unit. Creasing test images for triple coated samples with indicated coating layers of Example 3 are shown in FIG. 3. In this test photos were taken from the stained top side.

It will be obvious to a person skilled in the art that, as the technology advances, the inventive concept can be implemented in various ways. The invention and its embodiments are not limited to the examples described above but may vary within the scope of the claims.

The invention claimed is:

1. A method for barrier coating a subject, comprising:
   providing a water-based barrier coating composition containing:
   (A): (i) 40 to 95% by weight of a total weight of (A), an aqueous polymer composition obtainable by free radical (co)polymerizing an ethylenically unsaturated monomer blend containing:
   (a) 0 to 70% by weight of at least one optionally substituted styrene,
   (b) up to 100% by weight of at least one C1-C4-alkyl (meth)acrylate,
   (c) 0 to 10% by weight of other ethylenically unsaturated copolymerizable monomers, in a presence of,
   (d) 0 to 40% % by weight of degraded starch having a molecular weight $M_n$ of 500 to 10,000, wherein a sum (a)+(b)+(c)+(d) is 100%;
   (ii) 2 to 55% by weight of the total weight of (A) of polyvinyl alcohol (PVA), optionally polymerized together with components of (i);
   (iii) 2 to 30% by weight of the total weight of (A) of a plasticizer;
   (iv) 5 to 30% by weight of the total weight of (A) a composition containing C16-C18 alkenyl ketene dimer, optionally as a mixture with rosin, whereby a ratio of the C16-C18 alkenyl ketene dimer:rosin is from 100:0 to 25:75;
   (v) 5 to 20% by weight of the total weight of (A) of a gelling agent; and
   (B): a filler, wherein a ratio of (A):(B) is from 2:5 to 1:1; and
   applying the water-based barrier coating composition to at least part of a surface of a subject by
   applying the water-based barrier coating composition as a first water-based coating composition, wherein said first water-based coating composition contains (A) and (B), to at least part of a surface of a subject to obtain a precoated subject; and
   then applying the second water-based barrier coating composition as a second water-based composition, wherein said second water-based coating composition comprises (A) but does not contain (B), to at least a precoated surface of the subject to obtain a top coated subject.

2. A method as claimed in claim 1, wherein the first water-based coating composition comprises:
   0% by weight of (iv), and the second water-based coating composition comprises:
   more than 0% by weight of (iv).

3. A method as claimed in claim 1, wherein said subject is paper or paperboard.

4. A method as claimed in claim 1, wherein said subject is a food packaging.

5. Method for barrier coating a subject with a water-based barrier coating composition, as claimed in claim 1 for forming a grease barrier on paper or paperboard.

6. A method as claimed in claim 1, wherein a sum (i)+(ii)+(iii)+(iv)+(v) is 100%.

7. A method as claimed in claim 1, wherein the PVA (ii) is selected from a group consisting of fully or partially hydrolyzed grades having molecular weight equal to or less than 50000.

8. A method as claimed in claim 1, wherein the plasticizer (iii) is selected from a group consisting of glycerol, polyethylene glycol (PEG), sorbitol, and mixtures thereof.

9. A method as claimed in claim 1, wherein the gelling agent (v) is a protein or an alginate.

10. A method as claimed in claim 9, wherein the gelling agent (v) is selected from a group consisting of corn, zein, whey, casein, soy protein, carboxy methyl cellulose and gluten.

11. A method as claimed in claim 10, wherein the gelling agent (v) is gluten.

12. A method as claimed in claim 1, wherein the filler (B) is talc or kaolin.

13. A method as claimed in claim 1, wherein the aqueous polymer composition (i) is obtained by free radical (co)polymerization of ethylenically unsaturated monomer blend comprising:
   (a) 0 to 70% by weight of at least one optionally substituted styrene,
   (b) up to 100% by weight of at least one C1-C4-alkyl (meth)acrylate, and
   (c) 0 to 10% by weight of other ethylenically unsaturated copolymerizable monomers, in a presence of,
   (d) 0 to 40% by weight of degraded starch having a molecular weight Mn of 500 to 10,000, and
   (e) a graft-linking, water-soluble redox system as free radical initiator for the free radical emulsion copolymerization,
   wherein a sum (a)+(b)+(c)+(d) is 100%.

14. A method as claimed in claim 1, wherein components of (i) and (ii) are polymerized together.

15. A method as claimed in claim 14, wherein a mixture of (i) and (ii) is a free radical emulsion copolymerization of ethylenically unsaturated monomers comprising:
   (a) 0 to 60% by weight of at least one optionally substituted styrene,
   (b) up to 100% by weight of at least one C1-C4-alkyl (meth)acrylate, and
   (c) 0 to 10% by weight of other ethylenically unsaturated copolymerizable monomers, and (ii), in the presence of:
   (d) 0 to 40% by weight of degraded starch having a molecular weight Mn of 500 to 10,000, and
   (e) a graft-linking, water-soluble redox system as free radical initiator for the free radical emulsion copolymerization.

16. A method as claimed in claim 15, wherein the amount of starch (d) is 0% by weight.

17. A method as claimed in claim 15, wherein a ratio of (i):(ii) is from 45:55 to 60:40.

18. A method as claimed in claim 14, wherein an amount of (i) is 45 to 60% by weight of the total weight of (A) and the amount of (ii) is 40 to 55% by weight of the total weight of (A).

19. A method as claimed in claim 1, wherein the mixture of (i) and (ii) is a blended mixture.

20. A method as claimed in claim 1, wherein an amount of (i) is 50 to 95% by weight of the total weight of (A), and an amount of (ii) is 2 to 20% by weight of the total weight of (A).

21. A method as claimed in claim 19, wherein an amount of starch (d) is 20 to 40% by weight.

22. A method as claimed in claim 21, wherein an amount of component (iv) is from 2 to 15% by weight of the total weight of (A).

23. A method as claimed in claim 1, wherein a ratio of alkenyl ketene dimer:rosin (iv) is from 8:2 to 2:8.

24. A method as claimed in claim 1, wherein a glass transition temperature (Tg) of the (co)polymer is from −40° C. to 50° C.

25. A method as claimed in claim 1, wherein an amount of (a) is 20 to 60%, by weight.

26. A method as claimed in claim 1, wherein the monomer component (b) is n-butyl acrylate.

* * * * *